United States Patent [19]

Török

[11] Patent Number: 5,047,680
[45] Date of Patent: Sep. 10, 1991

[54] ROTATING ELECTRICAL MACHINE

[75] Inventor: Vilmos Török, Lidingö, Sweden

[73] Assignee: Astra-Tech AB, Stockholm, Sweden

[21] Appl. No.: 476,471

[22] PCT Filed: Nov. 25, 1988

[86] PCT No.: PCT/SE88/00645
§ 371 Date: Jun. 5, 1990
§ 102(e) Date: Jun. 5, 1990

[87] PCT Pub. No.: WO89/05540
PCT Pub. Date: Jun. 15, 1989

[30] Foreign Application Priority Data

Dec. 9, 1987 [SE] Sweden .................................. 8704913

[51] Int. Cl.[5] ..................... H02K 16/00; H02K 21/12; H02K 21/26
[52] U.S. Cl. .................................. 310/156; 310/152; 310/114
[58] Field of Search ............... 310/114, 152, 156, 162, 310/168

[56] References Cited

U.S. PATENT DOCUMENTS

| 690,060 | 12/1901 | Jacoby. | |
|---|---|---|---|
| 2,796,571 | 6/1957 | Dunn | 318/171 |
| 3,411,059 | 11/1968 | Toshimasa Kziwa | 310/156 |
| 3,950,663 | 4/1976 | Mead | 310/49 R |
| 4,126,798 | 11/1978 | Carr, Jr. et al. | 310/204 |
| 4,127,802 | 11/1978 | Johnson | 318/696 |
| 4,206,374 | 6/1980 | Goddijn | 310/49 R |
| 4,661,736 | 4/1987 | Kawada et al. | 310/156 |
| 4,810,914 | 3/1989 | Karidis et al. | 310/12 |
| 4,882,515 | 11/1989 | Radomski | 310/263 |
| 4,920,294 | 4/1990 | Christiaens et al. | 310/162 |

FOREIGN PATENT DOCUMENTS 1375070  7/1963  France .................................. 310/114

Primary Examiner—Steven L. Stephan
Assistant Examiner—Dennis R. Haszko
Attorney, Agent, or Firm—Browdy and Neimark

[57] ABSTRACT

A rotating electric machine comprises a rotor and a stator each having a ferromagnetic core and being separated by a cylindrical air gap. The stator core is provided with three peripheral rings of magnet poles, the poles in each pole ring having alternate opposite polarities and the pole rings having the same number of poles and being spaced axially apart. The rotor core is provided with three peripheral ferromagnetic rings each having peripherally uniformly spaced teeth and spaces therebetween. These toothed rings are located opposite the magnet pole rings and each includes a number of teeth equal to half the number of magnet poles in each magnet pole ring. The mutual angular position between the magnet pole ring and the toothed ring in each associated pair is displaced peripherally in relation to the corresponding position in the other associated pairs by an angle equal to one third of the peripheral extension of a magnet pole pair. The stator core carries two annular coil windings which are coaxial to the motor axis and located between the magnet pole rings.

9 Claims, 2 Drawing Sheets

ROTATING ELECTRICAL MACHINE

The present invention relates to a rotating electrical machine having two mutually coaxial parts which are rotatable in relation to one another and each of which has a respective ferromagnetic core and a substantially cylindrical air gap which separates the cores of respective parts. The object of the invention is to provide such a machine, and then particularly a motor, which develops a high torque in relation to its volume and weight.

Modern electric motors which develop high torques in relation to their weight and volume are normally fitted with field poles in the form of permanent magnets.

It is known that high quality permanent magnets can be placed in the air gaps of electrical machines, without the risk of residual demagnetization. A parallelepipedic permanent magnet pole comprised of a material whose permeability is close to that of air and which is magnetized homogenously at right angles to its pole faces will act upon its surroundings in essentially the same manner as if it were replaced with a current conducting ribbon which extends along the edge surfaces of the pole and conducts an electric current whose strength is equal to the product of the coercive field strength of the material of the permanent magnet and the edge height of the pole thereof. This fictitious current conductor which leads the aforesaid fictitious current around the peripheral edge of the pole is referred to in the following as the edge conductor. Considered in this way, the force exerted on a permanent magnet pole under the influence of an externally applied magnetic field is understood to be the force exerted on the edge conductor under the influence of the external field. The edge conductors which bound the space between the two adjacent permanent magnet poles having mutually opposite polarities will therewith conduct edge currents in the same direction. An external magnetic field which penetrates through such an interspace will give rise to coacting forces of mutually equal value in those parts of the two edge conductors which lie adjacent this interspace. The manner in which the magnetic field varies within the periphery of respective pole faces has no effect on the force development.

A row of mutually adjacent permanent-magnet poles with alternately mutually opposite polarities gives rise to the largest combined driving force for a given absolute value of the external field which penetrates through the magnet pole interspaces, when the external field is directed perpendicularly to the pole faces and changes polarity from pole interspace to pole interspace. In other words, such a row of permanent magnet poles will be driven by the magnetic field which prevails at the edge lines of the pole interspaces, i.e. at the pole edges located adjacent the pole interspaces. One surprising result of this particular consideration is that for a given total size, volume and weight, of the permanent magnet and an external field of given size, the resultant force will be proportional to the number of pole interspaces and therewith the number of poles, and consequently this force, in principle, can be increased beyond all limits, by increasing the number of pole interspaces, i.e. the number of poles, without changing the combined total weight and volume of the permanent-magnet poles.

Naturally, the same reasoning can be applied when the aforesaid ficititious edge conductors are replaced with factual superconductive conductors in which large currents are able to flow with substantially no loss. Thus, in principle, permanent magnet poles can be replaced with superconductive conductors which extend around the circumference of the pole faces and conduct a direct current which corresponds to the product of the coercive field strength of the permanent magnet material and the edge height of the permanent magnet poles.

However, in the case of present day conventional electric motors equipped with permanent magnets, it is only possible to utilize to a limited extent the aforesaid circumstance that the resultant force at a given total volume and weight of the permanent magnets and a given size of the external field is proportional to the number of pole interspaces and can therefore in principle be increased by increasing the number of pole interspaces, i.e. the number of permanent magnet poles used.

The most common permanent magnet motors known at present have stator windings of the same kind as those used with asynchronous or synchronous motors. In the case of such motors, only a proportion of the total copper cross-section of the winding is effective in generating the external field which penetrates through the pole interspaces and therewith gives rise to said force development, this proportion being inversely proportional to the total number of poles present, i.e. $\frac{1}{4}$ p, where p is the number of permanent magnet poles. The product of the number of pole interspaces, i.e. the number of permanent magnet poles, and the strength of the external field is therefore essentially independent of the number of poles at a given total copper loss. Consequently, those improvements in the specific torque generated by the motor, i.e. torque in relation to volume and weight, which can be achieved by increasing the number of poles without, at the same time, increasing the volume and weight of the active motor components depend mainly on the possible decrease in the height dimension of the stator yoke and the length of the coil ends, which will only provide a marginal improvement when more than eight poles are included.

With regard to the relationship between the magnetic field generated in the permanent magnet pole interspaces by the stator windings and the number of permanent magnet poles, permanent magnet motors equipped with salient stator poles each having its own coil winding have essentially the same properties as the type of motor discussed in the preceding paragraph.

Consequently, the object of the present invention is to provide a rotating electrical machine, and in particular an electric motor, which is so constructed as to enable the before discussed fact that the resultant force generated by permanent magnet field poles or by field poles formed by superconductive coils which extend around the periphery of the pole faces is proportional to the number of pole interspaces, and therewith the number of poles, to be utilized much more effectively than is possible in present day conventional motors, so as to provide a motor which is capable of developing very high torques in relation to its volume and weight.

This object is achieved, in accordance with the invention, with a rotating electric machine constructed in accordance with the appended claims.

The invention will now be described in more detail with reference to the accompanying drawings, in which FIG. 1 is a schematic partial axial sectional view of one embodiment of a motor constructed in accordance with the invention;

Figure 1:
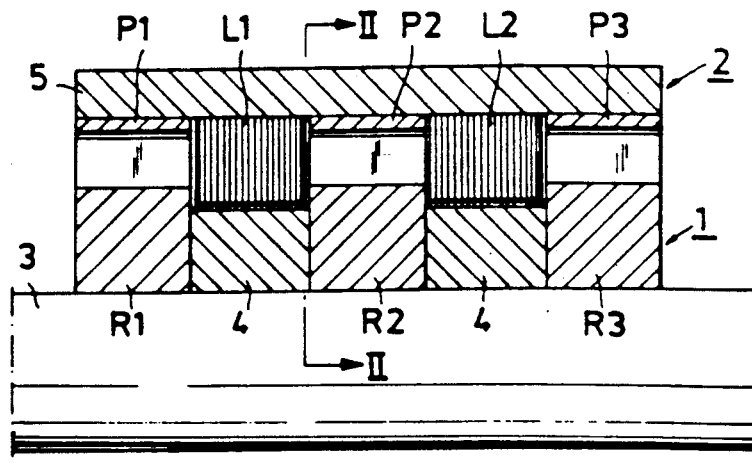
Figure 2:
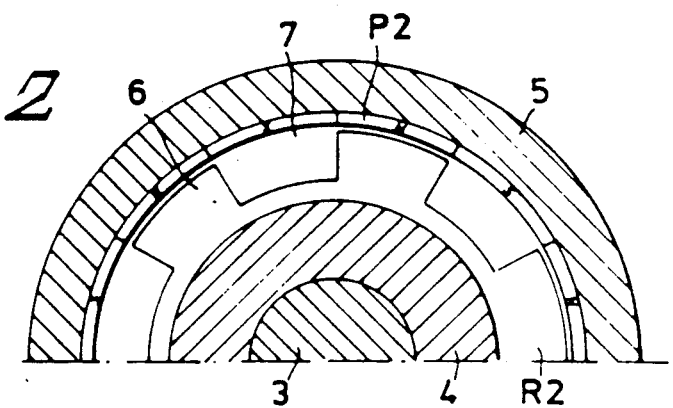
FIG. 2 is a radial sectioned view of the motor shown in FIG. 1, taken on the line II—II in FIG. 1.
Figure 3:
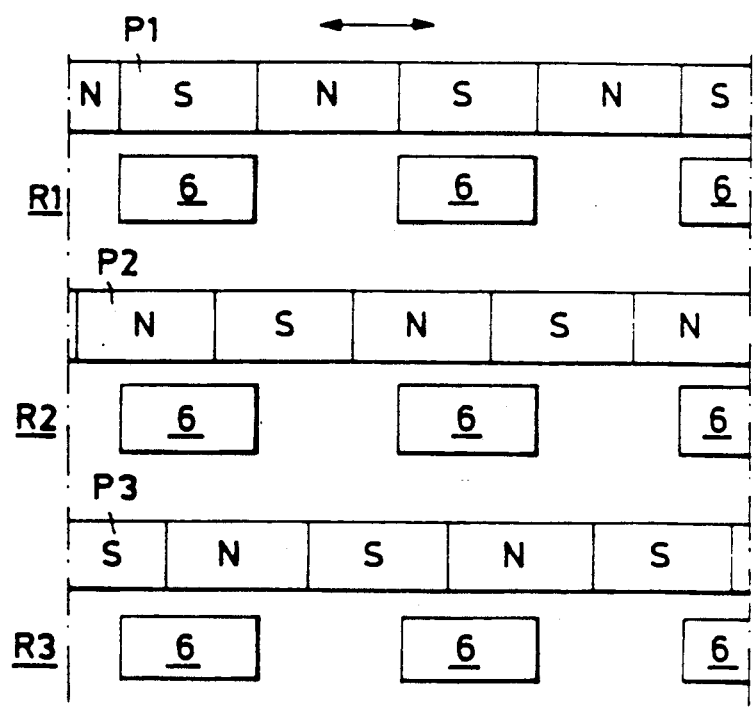
FIG. 3 is a schematic, expanded illustration of the arrangement of field poles and ferromagnetic components co-acting with said poles in the motor according to FIGS. 1 and 2.

The exemplifying, preferred embodiment of an inventive motor illustrated schematically in FIGS. 1-3 includes a rotor, generally referenced 1, and a stator which coaxially surrounds the rotor and which is generally referenced 2. The rotor 1 includes a shaft 3 on which there is mounted firmly a ferromagnetic core which comprises three mutually identical rings or annuli R1, R2 and R3, which are toothed around their outer circumferences and made of an isotropic ferromagnetic material, preferably of high volumetric resistivity, e.g. a material sold under the trade name COROVAC, and further comprises two rings 4 of ferromagnetic material disposed between said rings R1, R2, R3. The stator 2 includes a tubular stator core 5 which is made of an isotropic ferromagnetic material similar to that of the rings R1, R2, R3, and which carries on its inner surface three rings or annuli P1, P2 and P3 of permanent magnets of alternate opposite polarities, said pole rings being located opposite respective toothed rings R1, R2 and R3 on the rotor 1. Each of these rings of permanent pole pairs P1, P2, P3 may comprise a single permanent magnetic ring magnetized with alternate opposite polarities, or may be builtup of a number of individual permanent magnets which are joined to form a ring or annulus and the number of which corresponds to the number of poles. In order to reduce eddy current losses, the permanent magnets may, advantageously, be laminated, in which case the laminations will be parallel with the direction of the field and preferably extend peripherally. Alternatively, the permanent magnets may comprise mutually joined, electrically insulated grains or rods, for the same purpose as that given above.

The ferromagnetic stator tube 5 also carries two coil windings L1 and L2 which are disposed between the magnet pole rings P1, P2 and P3 and which are advantageously so mounted on the stator tube 5 as to obtain a good thermic connection between the coils and the stator tube.

As seen best from FIG. 2, each of the ferromagnetic rotor rings R1, R2, R3 has evenly spaced around its periphery teeth or pole bodies 6 which define respective interspaces 7 therebetween, the number of teeth 6 coinciding with the number of sale pairs in the permanent magnet pole rings P1, P2, P3.

The various magnet pole rings P1, P2, P3 and/or the various toothed ferromagnetic rings R1, R2, R3 are so displaced peripherally in relation to one another that the mutual position between the magnet pole ring and the toothed ring of each associated pair, e.g. P1 and R1, is displaced peripherally relative to the corresponding mutual position between the magnet pole ring and the toothed ring in each of the remaining associated pairs P2 and R2, and P3 and R3, through an angle corresponding to a third of the peripheral extension of the magnet pole pair. This is illustrated by way of example in FIG. 3, where the magnet pole rings P1, P2, P3 are mutually displaced peripherally through an angle which corresponds to one third of a magnet pole pair. Naturally, the toothed rings R1, R2, R3 may, instead, be displaced peripherally in relation to each other, in a corresponding manner. Alternatively, both the magnet pole rings P1, P2, P3 and the toothed rings R1, R2, R3 may be displaced peripherally in relation to each other to an extent which will satisfy the aforesaid condition concerning the mutual position between magnet pole ring and toothed ring of each coacting pair.

The two coil windings L1, L2 are supplied with alternating current governed by the angular position of rotation of the rotor 1, such that the frequency will be proportional to the speed of the rotor and to the number of poles in the magnet pole rings, and such that the mutual phase position between the supply currents in the two coil windings L1, L2 corresponds to the phase position between two phase currents in a symmetric three phase system.

The external fields generated by the coil windings L1, L2 are closed through the stator tube 5, the ferromagnetic rings 4 and R1, R2, R3, and the teeth 6 of the rings R1, R2, R3, and thereby coact with the permanent magnet poles in all magnet pole rings P1, P2, P3 in the previously described manner. This enables the total force developed, and therewith the motor torque, to be increased in a very effective manner, by increasing the number of magnet poles in the magnet pole rings P1, P2, P3. It will also be understood that the copper volume in the coil windings L1, L2 will be utilized very effectively, since these coil windings contain no coil ends, such coil ends being of no use in the development of force and merely constituting a loss creating factor. Furthermore, these coil windings L1, L2 can be wound readily with a very high fill factor, in that they are composed of profiled conductors.

Furthermore, because the permanent magnet poles P1, P2, P3 can be arranged together with the coil windings L1, L2, on the outer, preferably stationary, part of the motor, i.e. the outer stator, the pole interspaces of the permanent magnet poles, where the actual force development takes place, will be located at the furthest possible distance from the rotor shaft, which affords the longest possible lever arm for torque generation.

The permanent magnetic flux which passes through each of the ferromagnetic rings R1, R2, R3 when no current passes through winding coils L1, L2 can be caused to vary as a sine function of the angular position of the rotor in relation to the associated magnet pole ring, by judicious configuration of the surfaces of the teeth 6 which face towards the magnet pole rings P1, P2, P3 and/or of the individual pole faces of the permanent magnet poles. This, together with the aforedescribed mutual displacement between the various pairs of coacting magnet pole rings and toothed rings, i.e. the pairs P1 and R1, P2 and R2, P3 and R3, illustrated by way of example in FIG. 3, means that the sum of the permanent magnetic fluxes which pass through respective toothed rings R1, R2, and R3, and vary as sinusoidal functions, will always be zero, i.e. that the permanent magnetic flux which enters a given toothed ring R will pass through the connections 4 and exit through the other two toothed rings R.

Figure 4:
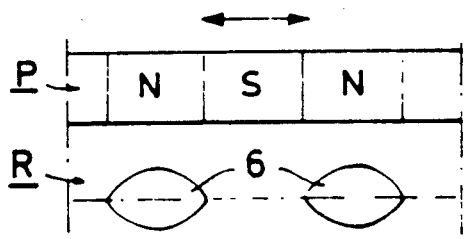
FIG. 4 is a schematic, expanded illustration of another conceivable configuration of the ferromagnetic components co-acting with the field poles in an inventive motor.

This sinusoidal variation of the permanent magnetic flux through a toothed ring R as a function of the angular position of the rotor can be achieved, for instance, by giving the surface of each of the teeth 6 of the toothed ring R which faces the permanent magnet pole ring P an axial extension which varies as a function of the center angle, in the same manner as the amplitude of a positive half period of a sinusoidal curve, while the permanent magnet poles are rectangular. This is illustrated schematically in FIG. 4.

Figure 5:
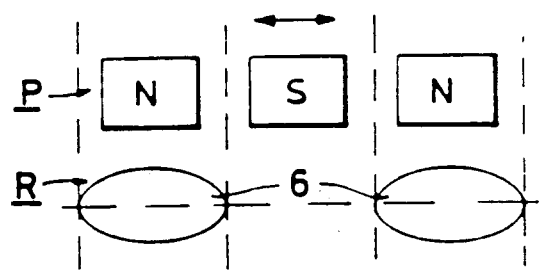
FIG. 5 is a schematic, expanded illustration of a further conceivable configuration of the field poles and the ferromagnetic components co-acting with the field poles in an inventive motor.

The same result can be achieved with a particularly advantageous embodiment in which the peripheral extension of the permanent magnet poles is only two thirds of the pole pitch, as illustrated in FIG. 5. In this case, the axial width of that surface of each tooth 6 which faces the associated permanent magnet pole ring P varies circumferentially in the same way as the height of one alternation of a wave that results from the superposition on a sine wave, the wavelength of which is equal to the center-to-center distance of adjacent teeth 6, and its related (third, ninth, etc.) harmonics. In other words, when proceeding in this manner the permanent magnetic flux in the ferromagnetic toothed rings R will vary as a function of the rotor angle in accordance with the desired sine curve. One example of such beneficial configuration of the axial extension of the teeth 6 as a function of the rotor angle is $$b = b_{MAX}\left[\frac{2}{\sqrt{3}}\sin(p\alpha) + k_3 \cdot \sin(3p\alpha) + k_9 \cdot \sin(9p\alpha)\right]$$

for $0 \leq p\alpha \leq \pi$ where b = the axial extension of the tooth
$b_{MAX}$ = the maximum axial extension of the tooth.
p = the number of teeth
$\alpha$ = the center angle of the toothed ring $$k_3 = \frac{19}{12\sqrt{3}} - 0.75$$

$$k_9 = 0.25 - \frac{5}{12\sqrt{3}}$$

One such embodiment is illustrated schematically in FIG. 5. Thus, this embodiment makes possible a saving of one third of the permanent magnet material, without detriment to the torque generating ability of the motor. This can have considerable significance economically, since the permanent magnetic material is expensive.

Figure 6:
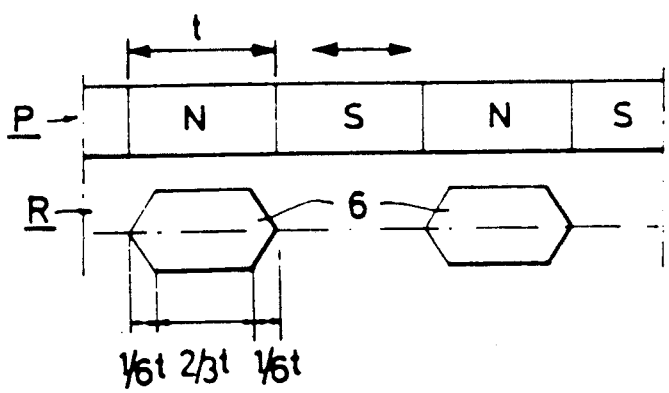
FIG. 6 is a schematic, expanded illustration of still another conceivable configuration of the field poles and the ferromagnetic components co-acting with the field poles in an inventive motor.
Figure 7:
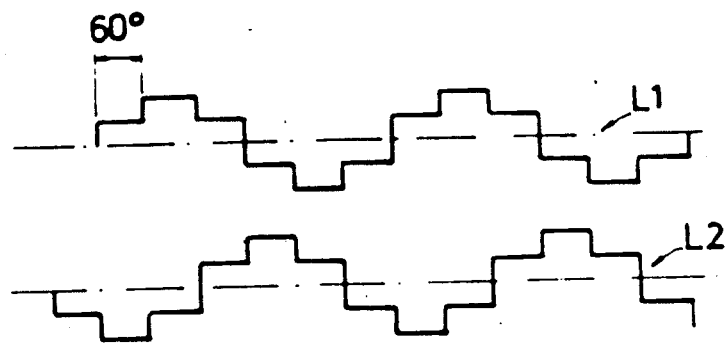
FIG. 7 illustrates the wave shape of the electric currents supplied to the motor windings in the case of an embodiment according to FIG. 6.

A further conceivable configuration of the pole faces of the magnet poles and of the tooth surfaces facing the magnet pole rings is illustrated in FIG. 6. In this case, the pole faces of the magnet poles are rectangular with a peripheral extension that corresponds to one single magnetic pole pitch t, in a similar manner to the embodiments of FIGS. 3 and 4, whereas the teeth 6 in the toothed rings R have a surface which is trapezoidal and varies in its axial direction. That part of the tooth surface 6 which is of uniform width in the axial direction has a peripheral extension corresponding to two thirds (⅔rds) of the pole pitch t, whereas those parts of the trapezoidal tooth surface 6 which tapers in the axial direction will each have a peripheral extension which corresponds to one sixth (1/6th) of the pole pitch t. Tooth surfaces 6 of this configuration can be used, advantageously, when the current supplied to the coil windings L1 and L2 does not have a sine waveform, but a stepped waveform, as illustrated in FIG. 7. Each of the "steps" in these stepped currents supplied to the coil windings L1 and L2 have a length which corresponds to 60 electric degrees.

Naturally, the same result as that described above with reference to FIGS. 4, 5, 6 and 7 can be achieved, by providing the teeth 6 of the toothed rings R with rectangular surfaces, and by varying the axial extension of the pole faces of the permanent magnet poles in the pole rings R, in the aforedescribed manner. This is less advantageous constructively, however, since it is easier to make the permanent magnets rectangular, owing to the fact that it is difficult to produce more complicated forms from the magnetic material.

As will be understood from the aforegoing, in the case of a motor which is constructed in accordance with the invention, the permanent magnet poles can, in principle, be replaced with field poles which are composed of superconductive coils which extend around the face of the poles.

It will also be understood that other embodiments of the inventive rotating electrical machine are conceivable, and that modifications can be made to the illustrated and described embodiments, without departing from the concept of the invention. For instance, it will be understood that the magnet pole rings P and the ferromagnetic toothed rings R can change places, without altering the principal function of the machine. Similarly, it will be realized that the coils L can be located on the rotating part of the machine, although this would require the provision of slip rings or like devices for leading the current into the coils.

Neither is there anything in principle which will prevent a machine constructed in accordance with the invention from being provided with a greater number of magnet pole rings, toothed rings and coil windings. Thus, generally speaking, an inventive machine may be provided with n-number of coil windings L, where n is an integer equal at least to two, and (n+1) pairs of coacting magnet pole rings P and toothed rings R, wherein each of the pairs of coacting magnet pole rings and toothed rings P and R is displaced peripherally in relation to another said pair through an angle corresponding to 1/(n+1) of the peripheral extension of a magnet pole pair, and wherein the various coil windings are supplied with alternating currents having mutual phase positions which correspond to the phase positions for n phase currents in a symmetric (n+1)-phase system. It will also be understood from the aforegoing that the magnet pole rings may have any desired number of magnet poles and that similarly the ferromagnetic toothed rings may have any desired number of teeth.

I claim:
1. A rotary electric machine comprising
inner and outer coaxial parts which are relatively rotatable about an axis of rotation, each of said inner and outer coaxial parts including a ferromagnetic core, and a substantially cylindrical air gap separating the cores,
at least three rings of magnet poles of alternating polarities on said ferromagnetic core of one of said inner and outer coaxial parts, said rings of magnet poles being coaxial with said axis of rotation and axially spaced-apart on the circumferential side of said core that faces said air gap, all of said rings of magnet poles having the same number of magnet poles, at least three rings of circumferentially spaced-apart teeth on the circumferential side of said ferromagnetic core of the other of said inner and outer coaxial parts that faces said air gap, each of said rings of teeth being coaxial with said axis of rotation and positioned opposite to an associated one of said rings of magnet poles to form therewith a cooperating pair of rings, the number of teeth of each said ring of teeth being half the number of magnet poles of each said ring of magnet poles, the relative angular position of said ring of teeth and said ring of magnet poles of each said cooperating pair of rings in any relative angular position of said inner and outer coaxial parts being angularly offset from the relative angular position of the rings of the other cooperating pairs of rings by one-third of the angular extent of one pair of adjacent magnet poles of each of said rings of magnet poles, and a pair of coil windings carried on one of said inner and outer coaxial parts, said windings being coaxial with said axis of rotation and each of said windings being positioned between adjacent ones of said cooperating pair of rings on said inner and outer coaxial parts.

2. A machine according to claim 1, characterized in that the two coil windings are intended to be supplied with alternating currents having a mutual phase position which corresponds to two phase currents in a symmetric three phase system.

3. A machine according to claim 1, characterized in that the coil windings and the magnet pole rings are disposed on one and the same machine part.

4. A machine according to claim 3, characterized in that the coil windings and the magnet pole rings are arranged on the outer part of the machine.

5. A machine according to claim 1, characterized in that the magnet poles are permanent magnets.

6. A machine according to claim 1, characterized in that the magnet poles are composed of superconductive conductors which extend peripherally around the pole faces and which are intended to be supplied with direct current.

7. A machine according to claim 1, characterized in that the magnet poles in the magnet pole rings have a rectangular pole face with a circumferential length corresponding to the pole pitch; and in that each tooth in the toothed rings has a circumferential length corresponding to a pole pitch in the magnet pole rings and an axial extension which varies as a function of the center angle in the same manner as the amplitude of a half period of a sine curve.

8. A machine according to claim 1, characterized in that the magnet poles in the magnet pole rings have a rectangular pole face with a circumferential length which corresponds to two thirds of a pole pitch; and in that each tooth (R) in the toothed rings (R) has a circumferential length which corresponds to a pole pitch in the magnet pole rings and an axial extension which varies as a function of the center angle in the same manner as the sum of a half period of a sine wave and its third harmonic and related harmonics.

9. A machine according to claim 1, characterized in that the magnet poles in the magnet pole rings have a rectangular pole face with a circumferential length which corresponds to a pole pitch; and in that each tooth in the toothed rings has a circumferential length which corresponds to a pole pitch in the magnet pole rings and an axial extension which varies trapezoidally as a function of the center angle, the level part of the trapezium extending over a center angle which corresponds to two thirds of the center angle for a pole pitch in the magnet pole rings.

* * * * *